Jan. 31, 1950     R. L. SMITH     2,496,237
COFFEE MAKER
Filed Jan. 10, 1946
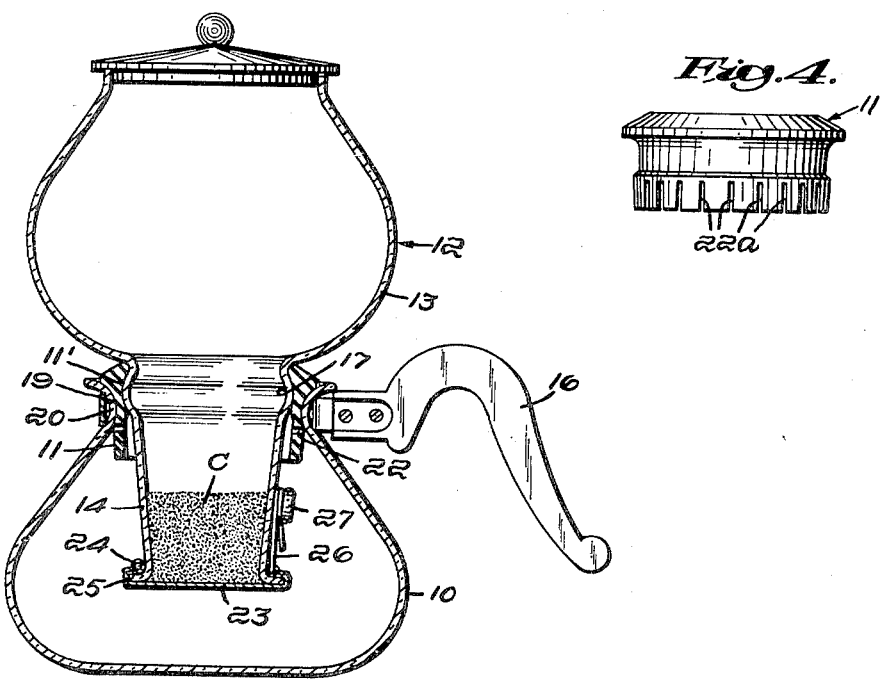
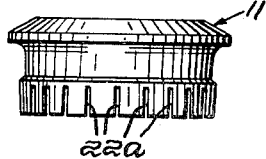
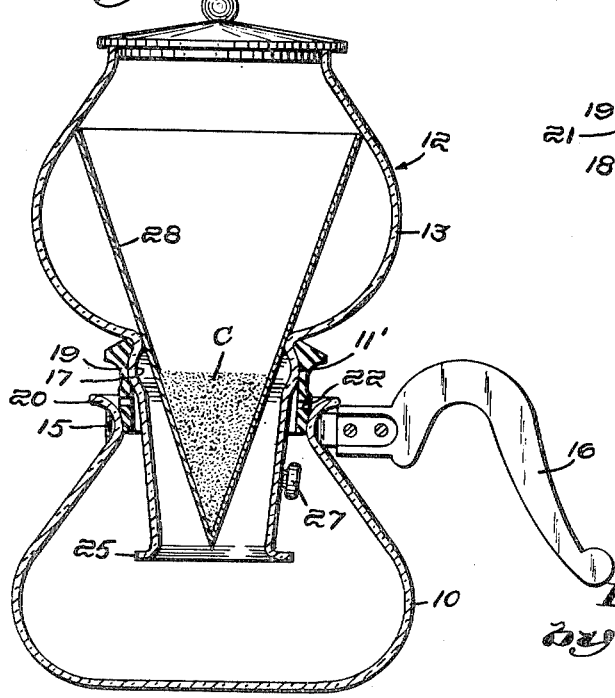
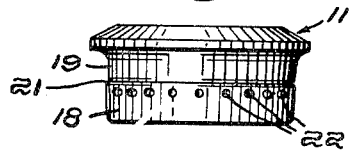
Inventor:
Roland L. Smith,
by Ross Rawlings.
Attorney Patented Jan. 31, 1950

2,496,237

UNITED STATES PATENT OFFICE 2,496,237

COFFEE MAKER

Roland L. Smith, Belmont, Mass., assignor to Nuproducts Corporation, Cambridge, Mass., a corporation of Massachusetts Application January 10, 1946, Serial No. 640,182

3 Claims. (Cl. 99—284)

This invention relates to coffee making machines of the type wherein an upper infusion vessel and a lower water-heating vessel are removably assembled to one another by telescoping one into the other.

In machines of this type, it is customary to apply a gasket of rubber or equivalent material to the mouth of the lower vessel into which the lower portion of the upper vessel is pressed from above to thereby connect the two vessels together.

The main object of my invention is to provide a gasket which when pushed completely down into the mouth of the lower vessel will operate in the conventional manner to produce "vacuum" coffee but which optionally may be pushed only partially down into the vessel so as to enable a "drip" coffee to be made without the creation of any vacuum. Thus, when a properly shaped upper vessel is used in connection with my gasket and the proper types of filters are supplied, a duplex coffee maker results.

Other objects and advantages of my invention will appear as this description proceeds.

In the accompanying drawing wherein I have shown a preferred embodiment of my invention in connection with machines for making coffee by either the "vacuum" or the "drip" process:

Figure 1 shows, in vertical section, a coffee maker for making "vacuum" coffee, equipped with my improved gasket.

Figure 2 is a similar view of a coffee maker for making "drip" coffee.

Figure 3 is a side elevation of the gasket shown in Figures 1 and 2, removed from the assembly, and Figure 4 shows a modification.

My coffee maker comprises a lower water-heating vessel 10 provided at its mouth with an internal gasket 11 of rubber or other suitable material, and an upper infusion vessel 12 removably assembled to said lower vessel by being pressed from above into said gasket.

The upper vessel 12 comprises an open-top bowl-like portion 13 terminating at its lower end in a tubular extension 14 of reduced diameter.

Vessel 10 at its mouth is formed to receive the usual clamping band 15 to which handle 16 is attached, and vessel 12 at the juncture of bowl 13 with tubular portion 14 is formed to provide an outwardly bulged annular convexity 17 for engagement with gasket 11.

Gasket 11 comprises a ring-like member of substantial vertical dimension. Beneath its upper edge, which is beveled, the gasket is internally concaved as at 11' to receive convexity 17 of vessel 12; externally, it is shaped to provide an annular concavity or seat 19 for the inwardly bulged annular portion or convexity 20 adjacent the mouth of vessel 10. Beneath such concavity, the gasket extends as a slightly tapered skirt 18 and is provided with one or more holes 22, preferably spaced slightly below the bevel 21 defining the upper edge of the skirt 18.

Instead of using a hole or holes 22, I may use a substantially vertical slot or slots 22a (see Fig. 4).

In making "vacuum" coffee (see Figure 1), the lower end of the tubular extension 14 is closed by a detachable filter 23 which converts said extension into a reservoir for the charge of ground coffee C. Filter 23 may take the form of a disc of cloth or other suitable material having a rim 24 to be pressed over the bottom flange 25 of extension 14 and fastened thereon by a drawstring 26, the free end or ends of which may be fastened off by winding around the neck of a knob or like projection 27 formed on extension 14 externally thereof. After gasket 11 is assembled to vessel 12, vessel 12 is inserted into vessel 10 with the concaved seat 19 of gasket 11, and particularly the place between bevel 21 and the holes, in tight engagement with the convexity 20 of said vessel.

In making "drip" coffee (see Fig. 2) a filter cone 28 of suitable material is substituted for filter disc 23 within vessel 12. Gasket 11 however, is so assembled on vessel 10 that its holes 22 are vented to the atmosphere above the lip of said vessel rather than being sealed by the convexity 20, as in Fig. 1, and hence there is no sealing effect between the two vessels 10 and 12.

In other words, by simply regulating the distance that the gasket is pushed down into the mouth of the lower vessel the same gasket may be effectively used for making either "drip" or "vacuum" coffee.

In either case, however, the gasket fulfills its function of removably connecting the two vessels. Furthermore, in the case of "vacuum" coffee maker of Fig. 1, the holes 22 of said gasket also permit the vacuum to be more readily broken when the coffee making operation is completed by slightly tilting the vessels relative to one another so as to flex the material of the gasket and destroy the sealing contact.

Various modifications in design and arrangement may obviously be resorted to within the scope of my invention as defined by the appended claims.

Having thus described my invention, what I claim as new and desire to secure by Letters Patent is:

1. A duplex coffee maker for making either vacuum or drip coffee, comprising a lower vessel, an upper vessel, and a gasket of flexible material to be positioned at two optional distances within the mouth of the lower vessel for supporting the upper vessel in superimposed relationship to the lower vessel, said gasket having a depending skirt provided with at least one perforation which when vacuum coffee is being made is disposed at such an elevation relative to the lower vessel as to be sealed by a part of said vessel and when drip coffee is being made is disposed at such an elevation relative to said vessel as to be vented to atmosphere.

2. The structure of claim 1 in which the skirt of the gasket is tapered.

3. The structure of claim 1 in which the perforation or perforations are in the form of a substantially vertical slot or slots.

ROLAND L. SMITH.

REFERENCES CITED

The following references are of record in the file of this patent:

UNITED STATES PATENTS

| Number | Name | Date |
| --- | --- | --- |
| 1,967,983 | Wolcott | July 24, 1934 |
| 2,133,178 | Sieling | Oct. 11, 1938 |
| 2,230,901 | Nevins | Feb. 4, 1941 |
| 2,301,917 | Johnson | Nov. 17, 1942 |
| 2,381,104 | Burnham | Aug. 7, 1945 |